(12) United States Patent
Gromowski et al.

(10) Patent No.: US 11,622,649 B2
(45) Date of Patent: Apr. 11, 2023

(54) DEVICES FOR PROLONGING THE QUALITY OF WARM FOODS

(71) Applicant: Thermonator Holdings, LLC, Hales Corners, WI (US)

(72) Inventors: Paul Gromowski, Franklin, WI (US); Hemal Brahmbhatt, Hales Corners, WI (US); Gary Plassmeyer, Muskego, WI (US)

(73) Assignee: Thermonator Holdings, LLC, Hales Corners, WI (US)

( * ) Notice: Subject to any disclaimer, the term of this patent is extended or adjusted under 35 U.S.C. 154(b) by 726 days.

(21) Appl. No.: 16/580,780

(22) Filed: Sep. 24, 2019

(65) Prior Publication Data

US 2020/0138239 A1 May 7, 2020

Related U.S. Application Data

(60) Provisional application No. 62/756,000, filed on Nov. 5, 2018.

(51) Int. Cl.
*A47J 36/26* (2006.01)
*A47J 36/24* (2006.01)
*A47J 39/02* (2006.01)
*A47J 39/00* (2006.01)

(52) U.S. Cl.
CPC ........... *A47J 36/26* (2013.01); *A47J 36/2483* (2013.01); *A47J 36/2494* (2013.01); *A47J 39/003* (2013.01); *A47J 39/006* (2013.01); *A47J 39/02* (2013.01); *A23V 2002/00* (2013.01)

(58) Field of Classification Search
CPC .... A47J 37/0641; A47J 36/26; A47J 36/2483; A47J 39/006; A47J 36/2494; A47J 39/003; A47J 39/02; A47J 36/24; A23V 2002/00
See application file for complete search history.

(56) References Cited

U.S. PATENT DOCUMENTS

| | | | | |
|---|---|---|---|---|
| 3,303,839 | A * | 2/1967 | Tavan | F24C 15/2028 454/67 |
| 4,143,592 | A * | 3/1979 | Kuest | A47J 39/003 99/516 |
| 2012/0247445 | A1* | 10/2012 | McKee | A21B 2/00 126/21 R |

* cited by examiner

*Primary Examiner* — Dana Ross
*Assistant Examiner* — Kuangyue Chen
(74) *Attorney, Agent, or Firm* — Mohr IP Law Solutions, P.C.

(57) ABSTRACT

Devices for prolonging the quality of a warm food item contained within the device, the devices include an enclosure configured to receive the warm food item, the enclosure including a floor, a ceiling opposite the floor, sidewalk extending from the floor to the ceiling and defining an opening, the sidewalls, the floor, and the ceiling collectively defining an interior void of the enclosure, and a door operatively connected to the sidewalk in a position covering the opening in a closed position and configured to selectively move to an open position to provide access to the interior void through the opening, a convection heat source mounted inside the enclosure and configured to direct heated air within the enclosure, and a ventilation system mounted to the enclosure and configured to move air through the enclosure.

19 Claims, 7 Drawing Sheets

DEVICES FOR PROLONGING THE QUALITY OF WARM FOODS

CROSS REFERENCE TO RELATED APPLICATIONS

This application claims priority to U.S. Applications, Ser. No. 62/756,000, filed on Nov. 5, 2018, which is hereby incorporated by reference for all purposes.

BACKGROUND

The present disclosure relates generally to devices used with foods. In particular, devices for prolonging the quality of warm foods are described.

Restaurants and on-demand delivery services regularly deliver food to customers at their homes, offices, or other off-site locations and demand for food delivery is growing. Take-out food orders are also popular. Take-out and home delivery food orders share the challenge of maintaining the quality of ordered food as it is transported from the restaurant to the location where the customer desires to consume the food. The quality of food can also diminish in the time it takes for a customer to pick up or consume the food after it is prepared.

Customers expect the food they order to lie of high quality wherever and whenever they elect to consume the food. Those preparing food want the food to remain high quality despite the time necessary to transfer food from the restaurant to the customer's desired location or despite the time it takes for a customer to pick up or consume the food after it is prepared. In the case of foods traditionally served warm, customers also expect the food to remain warm when delivered to their chosen off-site location or until they pick up the food they ordered.

However, with conventional methods of delivering food, food can sometimes arrive at off-site locations at less than optimal quality. For example, hot food may be cold, crispy chips may be stale, and otherwise plump sandwiches may be squashed.

Existing equipment and devices for holding or delivering food after it is prepared fail to adequately maintain the temperature of the food within acceptable ranges over the time periods needed. For example, placing warm food in boxes or plastic containers allows the food to quickly cool to sub-optimal temperatures. Placing warm food in insulated containers or sleeves slows the rate of cooling, but the food still cools below optimal levels too quickly for many take-out and delivery order scenarios. Placing food in ovens allows food to be maintained at a desired temperature, but conventional ovens are often not configured to be easily transported in delivery vehicles.

Another significant limitation of conventional equipment and devices for maintaining food quality is that they do not adequately manage moisture levels in the environment surrounding the food. Subjecting food to moist environments can cause the food to become soggy and/or chewy. Excess moisture can also cause food to degrade or spoil.

Delivering pizza is one scenario where managing moisture surrounding the food is crucial. When delivering pizza, the pizza is typically placed inside a box and the box is placed inside an insulated bag to keep die pizza warm. The insulated bag and conventional box tend to trap steam and moisture escaping from the pizza within the box, which causes the moisture levels within the box to increase. The increased moisture in the box tends to make the pizza soggy and the crust chewy. French fries represent another type of food where maintaining an environment with proper temperature and moisture levels is crucial for prolonging the quality of the food.

Thus, there exists a need for devices that prolong the quality of warm foods that improve upon and advance the design of known equipment and devices used to store or transport food after it is prepared. Examples of new and useful devices relevant to the needs existing in the field are discussed below.

SUMMARY

The present disclosure is directed to devices for prolonging the quality of a warm food item contained within the devices, the devices include an enclosure configured to receive the warm food item, the enclosure including a floor, a ceiling opposite the floor, sidewalls extending from the floor to the ceiling and defining an opening, the sidewalls, the floor, and the ceiling collectively defining an interior void of the enclosure, and a door operatively connected to the sidewalls in a position covering the opening in a closed position and configured to selectively move to an open position to provide access to the interior void through the opening, a convection hear source mounted inside the enclosure and configured to direct heated air within the enclosure, and a ventilation system mounted to the enclosure and configured to move air through the enclosure.

DETAILED DESCRIPTION

Figure 1:
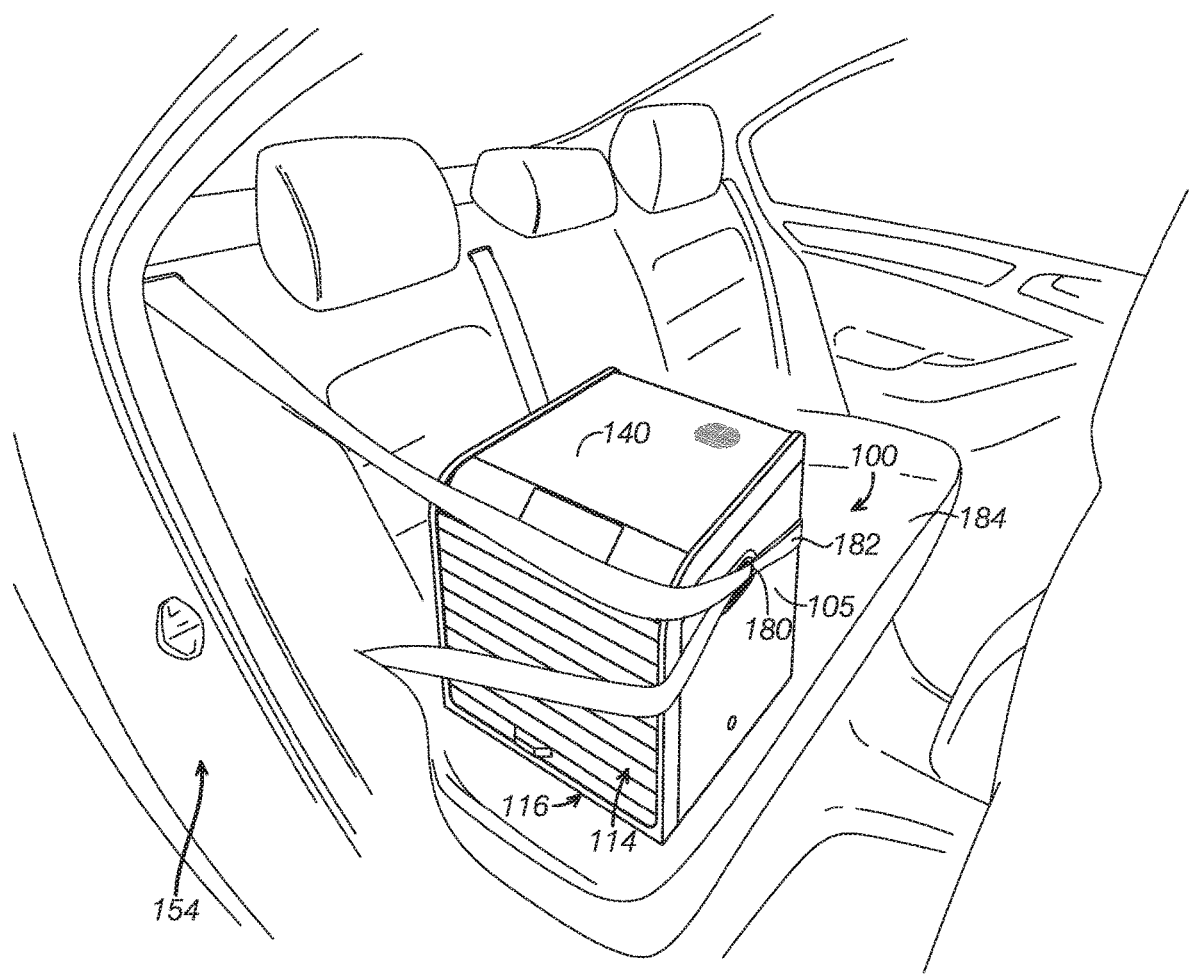
FIG. 1 is a perspective view of a device for prolonging the quality of a warm food item with a door of an enclosure in a closed position and the device supported on the sear of a vehicle.

The disclosed devices will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that die object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Food Item

The features of food item 102 will first be described to aid the discussion of the devices disclosed herein. A wide variety of food items are served warm and are prone to diminish in quality as time elapses after they are prepared and/or as their temperature decreases. The devices are effective to prolong the quality more foods than can be reasonably listed.

A sample of foods for which the devices below are effective to prolong their quality include hamburgers, country fried steak, fried chicken, fried fish, fried shrimp, fried pork chops, tried tofu, fried veggies, French fries, tater tots, fried sweet potatoes, breads, pizza, calzones, pizza rolls, fried cheeses, potato chips, onions rings, corn dogs, toasted ravioli, chicken fried bacon, fried peanuts, fried spam, fried fruits, fried candy bars, sandwiches, fried turkey, fried wild game, fried insects, hash browns, home fries, fried dough, coffee, tortilla shells, fried rice, rice, deep fried pasta, pasta, pita, pita chips, pancakes, waffles, toast, crepes, omelets, souffles, hot dogs, sausages, brats, bagels, English muffins, chimichanga, churros, egg rolls, funnel cakes, pasties, Scotch eggs, wonton, crab Rangoons, Rocky Mountain oysters, fried pickles, cakes, brownies, and cookies. The devices discussed herein may accommodate any currently known or later developed type or variety of food item that is subject to diminishing quality over time or decreasing temperature.

Vehicle

The devices described below may be secured to a vehicle and transported to remote locations. The vehicle to which the device is secured may be any currently known or later developed vehicle. For example, the vehicle may be an automobile, truck, moped, motorcycle, bicycle, electric scooter, and the like. In some examples, the vehicle is a robotic vehicle that moves autonomously, semi-autonomously, or at the direction of a person manually controlling its movement. In certain examples, a person carries the enclosure on his or her back while riding a bicycle, scooter, or other similar vehicle. Additional examples include robotic delivery systems, drones, food trucks, e-bikes, mopeds, and specially configured food delivery cars, buses, and trucks.

Devices for Prolonging the Quality of Warm Food Items

With reference to the figures, devices for prolonging the quality of warm food items will now be described. The devices discussed herein function to prolong the quality of warm food items, such as when delivering food to customers or when waiting for customers to pick up food items they ordered to take out. Additionally or alternatively, the present devices function to prolong the quality of warm food items when waiting to serve food items to dine-in customers or to people at catered events. Another application for the present devices is to prolong the quality of food when transporting or waiting to serve the food to friends and family.

The reader will appreciate from the figures and description below that the presently disclosed devices address the shortcomings of conventional equipment and devices described above. For example, unlike some equipment and devices that allow food to cool down over time, the present devices maintain food at warm temperatures for as long as needed. Further, the present devices allow for the food to be maintained at a desired temperature for relevant timeframes while transporting the food item to a remote location in contrast to conventional ovens that are fixed in place to keep food warm.

Beyond maintaining the warmth of food items, the devices discussed herein maintain other desirable attributes of food that consumers expect. For example, the devices described here maintain the crispiness of foods intended to be crispy in contrast to conventional equipment and devices that generally allow crispy foods to become limp, soggy, and stale. The present devices also function to maintain the expected levels of chewiness and moistness of the food items.

The devices described herein have been observed to maintain food at acceptable quality levels for sixty minutes or more. Food will typically degrade in quality over extended periods of time after being freshly prepared. The present devices are effective to significantly extend the time that food remains at a high level of quality after being prepared.

The devices presented below effectively manage moisture levels in the environment surrounding the food unlike conventional equipment and devices. By maintaining an environment with proper moisture levels, the present devices avoid the food becoming soggy and/or chewy. Not exposing the food to excess moisture also helps avoid the food degrading or spoiling.

Device Embodiment One

With reference to FIGS. 1-7, a first example of a device, device 100, will now be described. Device 100 includes an enclosure 104, a convection heat source 120, a radiant heat source 122, a ventilation system 124, a shelf 126, an air directing system 146, and a portable power source 156.

In some examples, die device does not include one or more features included in device 100. For example, some device examples do not include a radiant heat source, a shelf 126, an air directing system 146, or a portable power source 156.

In other examples, the device includes additional or alternative features, such as as thermometers and hygrometers to measure temperature and humidity levels in the enclosure. In some examples, the device includes electronics, such as computing devices, displays, audio devices, communication devices, location devices, and user interface devices to control, communicate, and process conditions in the enclosure as well as to report the position of the enclosure.

For example, the enclosure may include Bluetooth communication devices to communicate data about the enclosure and conditions within the enclosure, such as temperature, humidity, and air flow rates. The enclosure may include a global positioning system to facilitate tracking the geographic position of die enclosure. In some examples, the enclosure includes artificial intelligence to recognize food items and to facilitate automatically adjusting temperature and air flow rate parameters within the enclosure.

The device may include a display screen and a user interface to allow users to adjust temperatures, air flow rates, and humidity level set points, and to select the type of food placed within the enclosure. The device may additionally or alternatively include seat belt straps configured to secure the enclosure to a given delivery vehicle.

Enclosure

Enclosure 104 is configured to receive and contain warm food item 102 until the person for which warm food item 102 is intended is ready for it. As can be seen in FIGS. 1-7, enclosure 104 includes a floor 106, a ceiling 108 opposite floor 106, sidewalls 109 extending from floor 106 to ceiling 108, and handles 180 mounted to sidewalls 109. Sidewalls 109, floor 106, and ceiling 108 may collectively define an interior void 112 of enclosure 104.

Figure 2:
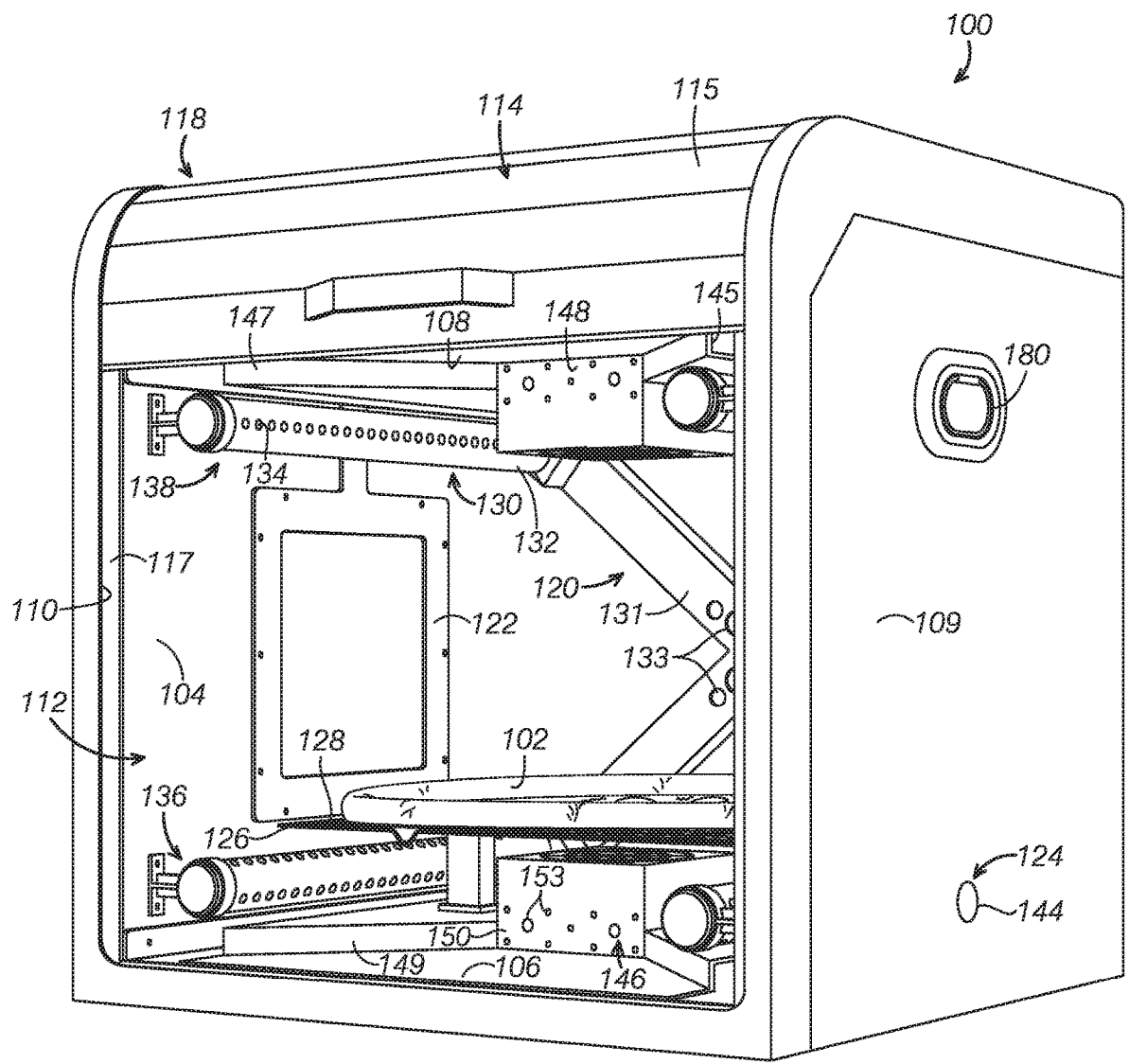
FIG. 2 is a perspective view of the device shown in FIG. 1 depicting the door in an open position to reveal features contained within the enclosure, including a warm food item supported on a shelf.
Figure 3:
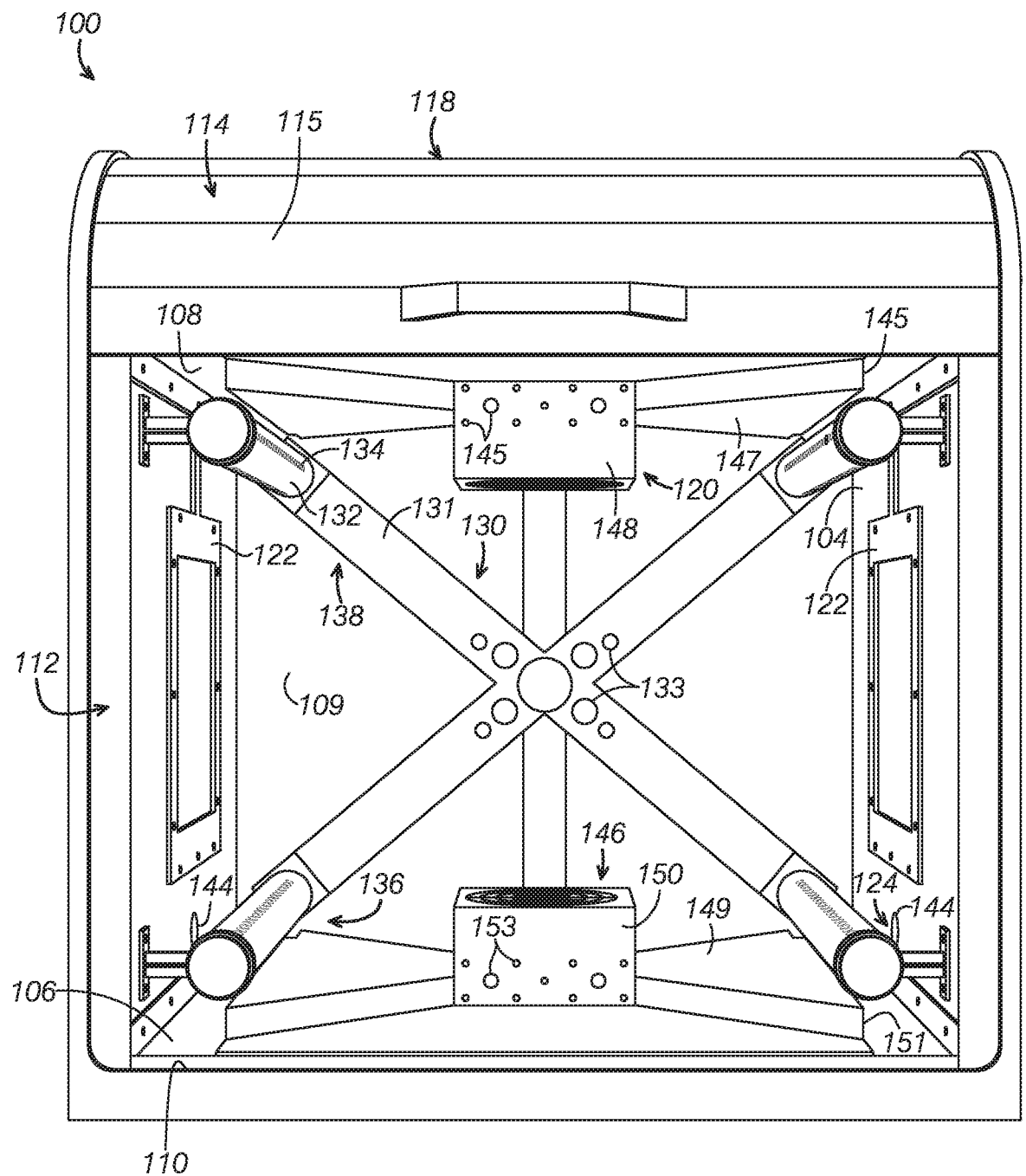
FIG. 3 is a front elevation view of the device shown in FIG. 1 with the door in the open position.
Figure 4:
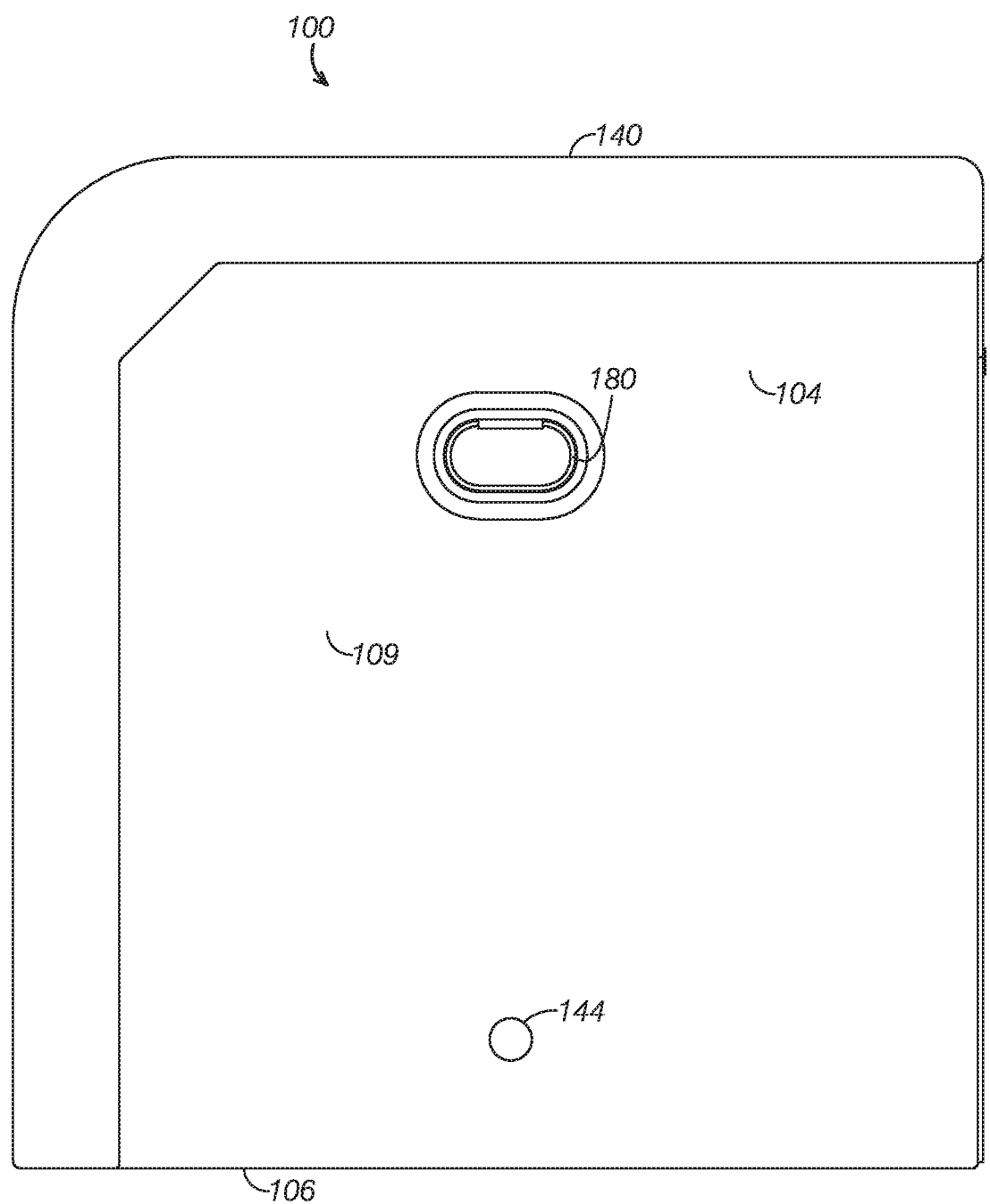
FIG. 4 is a right side elevation view of the device shown in FIG. 1, depicting a sidewall vent defined in a sidewall of the enclosure.

As can be seen in FIGS. 1-3, sidewalls 109 define an opening 110 through which interior void 112 may be accessed. In the present example, sidewalls 109 are comprised of a thermally insulating material. Any currently known or later developed insulating material is suitable.

In the present example, enclosure 104 further includes a door 114 proximate opening 110. Door 114 is operatively connected to the sidewalls 109 and is configured to move between a closed position 116 covering opening 110 and an open position 118. As shown in FIGS. 2 and 3, in open position 118 door 114 does not cover at least a portion of opening 110 to provide access to interior void 112 through opening 110.

As shown in FIGS. 1-3, door 114 includes linked slats 115. Linked slats 115 enable door 114 to follow a curved path defined by track 117 when moving between open position 118 and closed position 116. The configuration of door 114 may be described as a tambour configuration similar to that used in roll top desks.

As shown in FIGS. 1-6, enclosure 104 includes a roof 140 spaced above ceiling 108. The space between roof 140 and ceiling 108 accommodates components of device 100, such as electronics, portable power source 136, and portions of ventilation system 124. The portions of ventilation system 124 disposed between ceiling 108 and roof 140 are in fluid communication with enclosure 104 and the environment outside enclosure 104. A ceiling vent is obscured in FIG. 7 by exhaust fan 142, which overlies the ceiling vent, and is obscured in FIG. 2 by ceiling fan 148 and ducts mounted to ceiling 108. The ceiling vent is defined in ceiling 108 supplies an exhaust fan 142 with air from within enclosure 104, including moisture-laden air. Exhaust fan 142 blows the air through an exhaust outlet 143 formed in roof 140.

In the example shown in FIGS. 1-7, enclosure 104 is approximately cubical in shape with substantially rectangular cross sections in each coordinate axis. In other examples, the enclosure is cylindrical, pyramidal, or a variety of other regular and irregular shapes. The shape of die enclosure may be any shape suitable for containing a warm food item.

In the particular example shown in the figures, enclosure 104 is configured to be carried by a person with handles 180 mounted to sidewalls 109. Further, enclosure 104 is complimentarily configured with a vehicle 154 to facilitate transporting warm food item 102 in enclosure 104 with vehicle 154. In the present example, enclosure 104 is configured to be carried by a person's bands using handle 180 and mounted on a vehicle by passing seatbelts 182 through handle 180 to secure enclosure 104 on seat 184. In some examples, the enclosure is configured to secure to a user's back, such as with straps or a harness.

Securing the enclosure to a vehicle may be accomplished by any currently known or later developed means. In some examples, sent belt straps pass through loops or other mounting points existing on the enclosure to secure the enclosure to the vehicle. In other examples, other elongate tension bearing members are utilized, such as bungee cords, rope, or straps.

In some examples, hook and loop fasteners or magnets are used to secure the enclosure to the vehicle. Clamps and other mechanical fasteners may additionally or alternatively be used. In certain examples, the vehicle and die enclosure are specially and complimentarily configured to selectively secure the enclosure to the vehicle.

The size of the enclosure may be larger or smaller than that shown in the figures. In examples where portability of the enclosure is intended, the enclosure may include features to secure the enclosure to a vehicle, such as mounting points through which a seatbelt or shoulder strap may pass.

Shelf

As shown in FIGS. 2 and 3, shelf 126 is configured to support warm food item 102 on a top surface 128. In some examples, die warm food item is contained in a container supported on the shelf. The container may include openings allowing fluid communication between the container and the enclosure. The shelf may be any currently known or later developed type of shelf suitable for use in heated environments.

The reader can see in FIGS. 2 and 3 that shelf 126 is mounted to enclosure 104 within interior void 112. In the present example, shelf 102 is disposed in a position surrounded by header system 130, overlying floor fan 150, underneath ceiling fan 150, and between radiant heat sources 122. The positioning of shelf 102, and, in turn, warm food item 102 supported on shelf 126, relative to convection heat source 120, radiant heat sources 122, and air directing system 146 enables convection heat source 120, radiant heat sources 122, and air directing system 146 to more effectively prolong the qualify of warm food item 102.

Convection Heat Source

In the example shown in FIGS. 1-7, convection heat source 120 is mounted inside enclosure 104 and is configured to direct heated air within enclosure 104. Convection heat source 120 includes a header system 130 and a fan (not visible) mounted inside header system 130. The fan blows heated air through header system 130 to direct heated air throughout enclosure 104. Any suitable form of fan or blower may be used. Convection heat source may be any currently known or later developed system or combination of air handling systems configured to direct heated air to defined regions.

As shown in FIGS. 2 and 3, header system 130 is mounted to enclosure 104 within interior void 112 proximate sidewalls 109. In the present example, shelf 126 is supported in enclosure 104 in a position surrounded by header system 130.

Header system 130 is configured to direct heated air throughout enclosure 104 from a plurality of positions. As can be seen in FIGS. 2 and 3, header system 130 includes four header ducts 131 and four pipes 132 fluidly connected to header ducts 131. Header ducts 131 define air inlets 133 to draw in air to feed the fin supplying air to pipes 132. Pipes 132 define heated air ports 134 along the length of pipes 132.

In the present example, header system 130 includes a lower portion 136 proximate shelf 126 and an upper portion 138 spaced from shelf 126. Lower portion 136 of header system 130 is positioned to direct heated air into interior void 112 underneath warm food item 102 supported on shelf 126. In contrast upper portion 138 of header system 130 is positioned to direct heated air into interior void 112 above warm food item 102 supported on shelf 126. Lower portion 136 and upper portion 138 cooperate to surround warm food item 102 supported on shelf 126 with heated air, which helps maintain crispiness and other quality attributes of warm food item 102.

Radiant Heat Source

As shown in FIGS. 2 and 3, two radiant hear sources 122 are mounted to sidewalls 109 inside enclosure 104 between lower portion 136 and upper portion 138 of header system 130. In the particular example shown in the figures, two radiant heat sources are included. In other examples, a single radiant heat source is included. In certain examples, more than two radiant heat sources are included.

Radiant heat sources 122 are configured to irradiate enclosure 104 and warm food item 102 received in enclosure 104. In some examples, the radiation heat source is positioned and/or shields or lenses are positioned cooperatively with radiation heat source, to exclusively irradiate one or more particular side of the warm food item, such as the top, left, right, or bottom side(s), etc. In other examples, the radiation heat source is positioned or shielded to not irradiate the warm food item and instead irradiate only portions of the enclosure. In each configuration, the radiant heat sources provide an additional and alternative heat source beyond convection heat source 120 for maintaining a desired temperature within enclosure 104.

In the example shown in the figures, radiant heat sources 122 are substantially planar, which allows them to function compactly and unobtrusively within enclosure 104. In other examples, the radiant heat sources have a more pronounced three-dimensional profile. The radiant heat sources have a more pronounced three-dimensional profile. The particular size and shape of the radiant heat sources is not significant and any currently known or later developed type of radiant heat source may be used.

Air Directing System

Air directing system 146 is configured to direct air within enclosure 104. In particular, air directing system 146 directs air towards warm food item 102 when warm food item 102 is supported on top surface 128 of shelf 126. Air directing system helps expose warm food item 104 to circulating warm air to prolong the crispiness and other desirable attributes of warm food item 104.

In the present example, air directing system 146 includes a ceiling tan 148, ceiling ducts 147, a floor fan 150, and floor ducts 149. Ceiling ducts 147 define air inlets 145 proximate sidewalls 109. The air inlets defined in ceiling ducts 147 pull in warm air from peripheral positions within enclosure 104 proximate sidewalls 109 and ceiling 108 and feed die warm air to ceiling fan 148.

Ceiling fan 148 is mounted to ceiling 108 and is configured to direct air towards top surface 128 of shelf 126. Ceiling fan 148 defines air inlets 145 to draw in air from a central region of enclosure 104 proximate ceiling 108. When warm food item 102 is supported on top surface 128 of shelf 126, ceiling tan 148 directs heated air towards a top side of warm food item 102. The ceiling fan may be any currently known or later developed type of fan or blower.

Floor ducts 149 define air inlets 151 proximate sidewalls 109. The air inlets defined in floor ducts 149 pull in warm air from peripheral positions within enclosure 104 proximate sidewalls 109 and floor 106 and feed the warm air to floor fan 150.

Floor fan 150 is mounted below shelf 126 and configured to direct air towards ceiling 108. Floor fan 150 defines air inlets 153 to draw in air from a central region of enclosure 104 proximate floor 106. With reference to FIGS. 2 and 3, floor fan 150 underlies shelf 126 in a position proximate the middle of shelf 126. Floor fan 150 underlying shelf 126 facilitates directing air towards an underside of warm food item 102 when warm food item 102 is supported on top surface 128 of shelf 126 proximate the middle of shelf 126. The floor fan may be any currently known or later developed type of fan or blower.

Ventilation System

Ventilation system 124 is configured to move air into and out of enclosure 104. Ventilation system 124 is in fluid communication with enclosure 104 and the environment outside enclosure 104. In particular, ventilation system 124 is configured to pull fresh air from outside enclosure 104 into enclosure 104 and to expel air from within enclosure 104 out of enclosure 104.

Expelling air out of enclosure 104 functions to remove moisture-laden air and to draw in relatively dry air to maintain desired moisture levels within enclosure 104. Maintaining relatively dry air within enclosure 104 facilitates keeping warm food item 102 crispy along with prolonging other desirable quality attributes of it.

Figure 7:
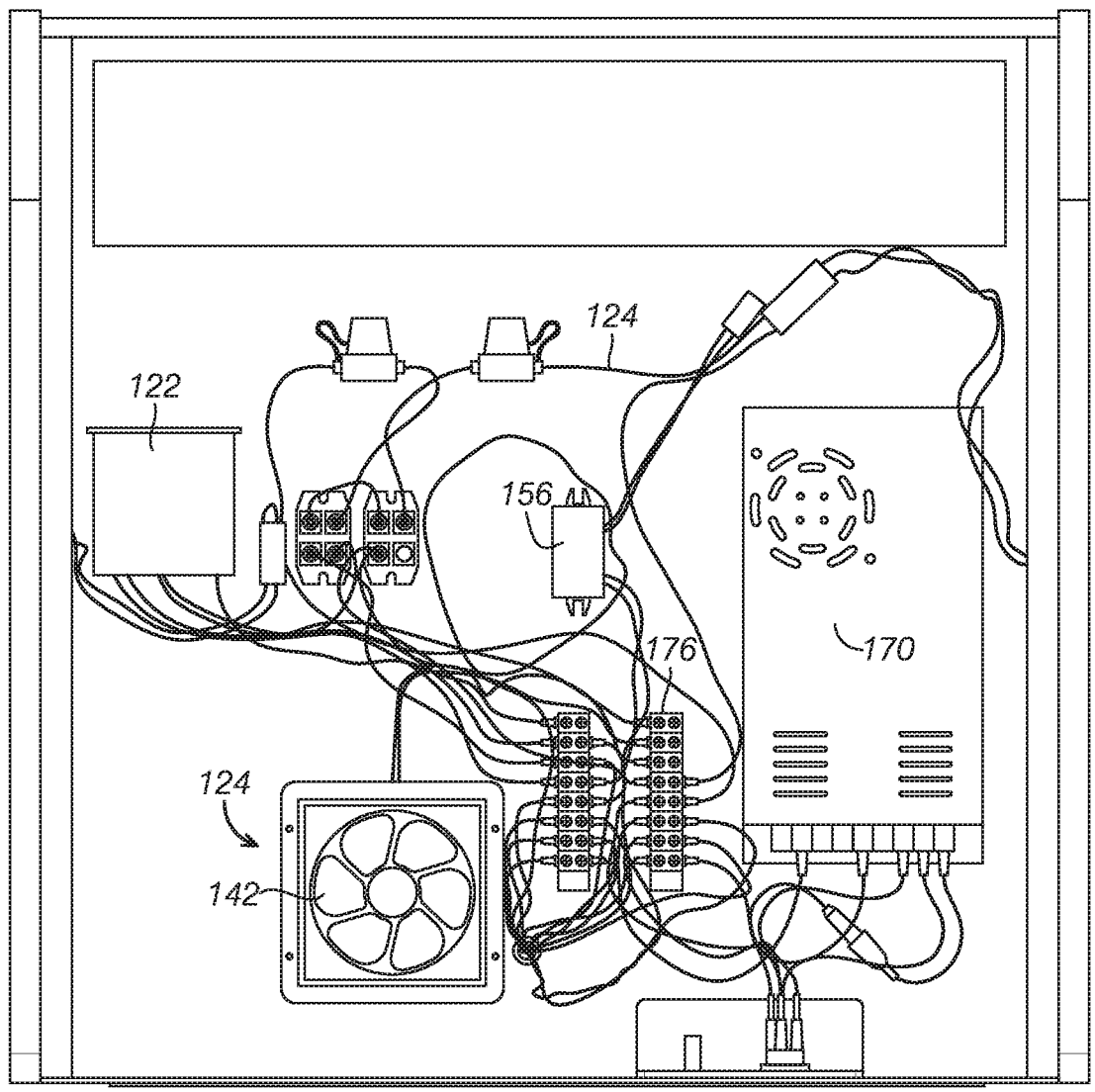
FIG. 7 is a top plan of the device shown in FIG. 1 with the roof removed to show components supported on a ceiling of the enclosure, including a battery, a temperature controller, an exhaust fan, and a power supply.

With reference to FIGS. 2, 3, and 7, the reader can see that ventilation system 124 is mounted to enclosure 104. Ventilation system 124 includes an exhaust fan 142, a ceiling vent (obscured by ceiling fan and ducts supported on the ceiling), and sidewall vents 144.

Exhaust fan 142 is mounted between ceiling 108 and roof 140 and is configured to direct air within enclosure 104 out of enclosure 104. The ceiling vent defined in ceiling 108 supplies exhaust fan 142 with air from within enclosure 104, including moisture-laden air. Exhaust fan 142 then blows the air supplied by the ceiling vent through an outlet formed in roof 140 to the outside environment.

Sidewall vents 144 are defined in sidewalls 109 proximate floor 106. Sidewall vents 144 are configured to supply fresh air from outside enclosure 104 into enclosure 104. The ventilation system may include any number of sidewall vents and the sidewall vents may be any size. The vents ideally supply sufficient fresh air to maintain desired moisture levels without cooling the interior of the enclosure to a significant degree. In some examples, the ventilation system includes forced air inlets rather than passive sidewall vents.

Portable Power Source

Portable power source 156 is configured to store energy and power one or more of convection heat source 120, radiant heat source 122, air directing system 146, and ventilation system 124. Powering convection heat source 120, radiant heat source 122, air directing system 146, and/or ventilation system 124 with portable power source 156 facilitates device 100 prolonging the quality of warm food item 102 when device 100 is not connected to a stationary power source. Portable power source 156 helps enable device 100 to operate its heat and moisture managing functions to prolong the quality of warm food items as device 100 travels to remote locations.

In the present example, portable power source 156 is a lithium ion battery. Other battery types are also suitable, including nickel metal hydride batteries and non-rechargeable batteries. In other examples, the portable power source is a fuel cell system, a fuel powered generator, or a portable solar power source. The portable power source may be any currently known or later developed type of portable power source.

Figure 5:
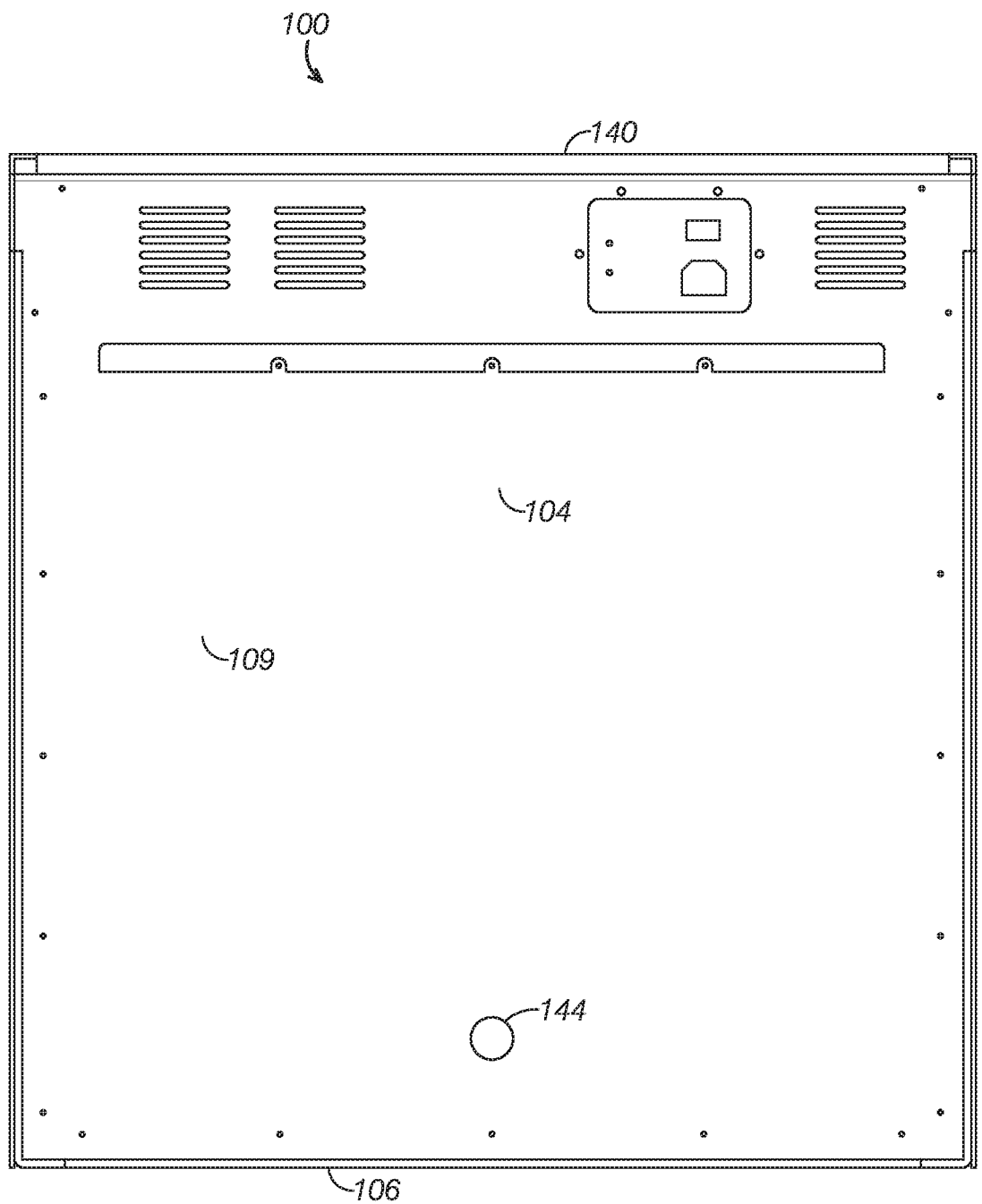
FIG. 5 is a rear elevation view of the device shown in FIG. 1 depicting a power cord socket and vents defined in a rear sidewall.
Figure 6:
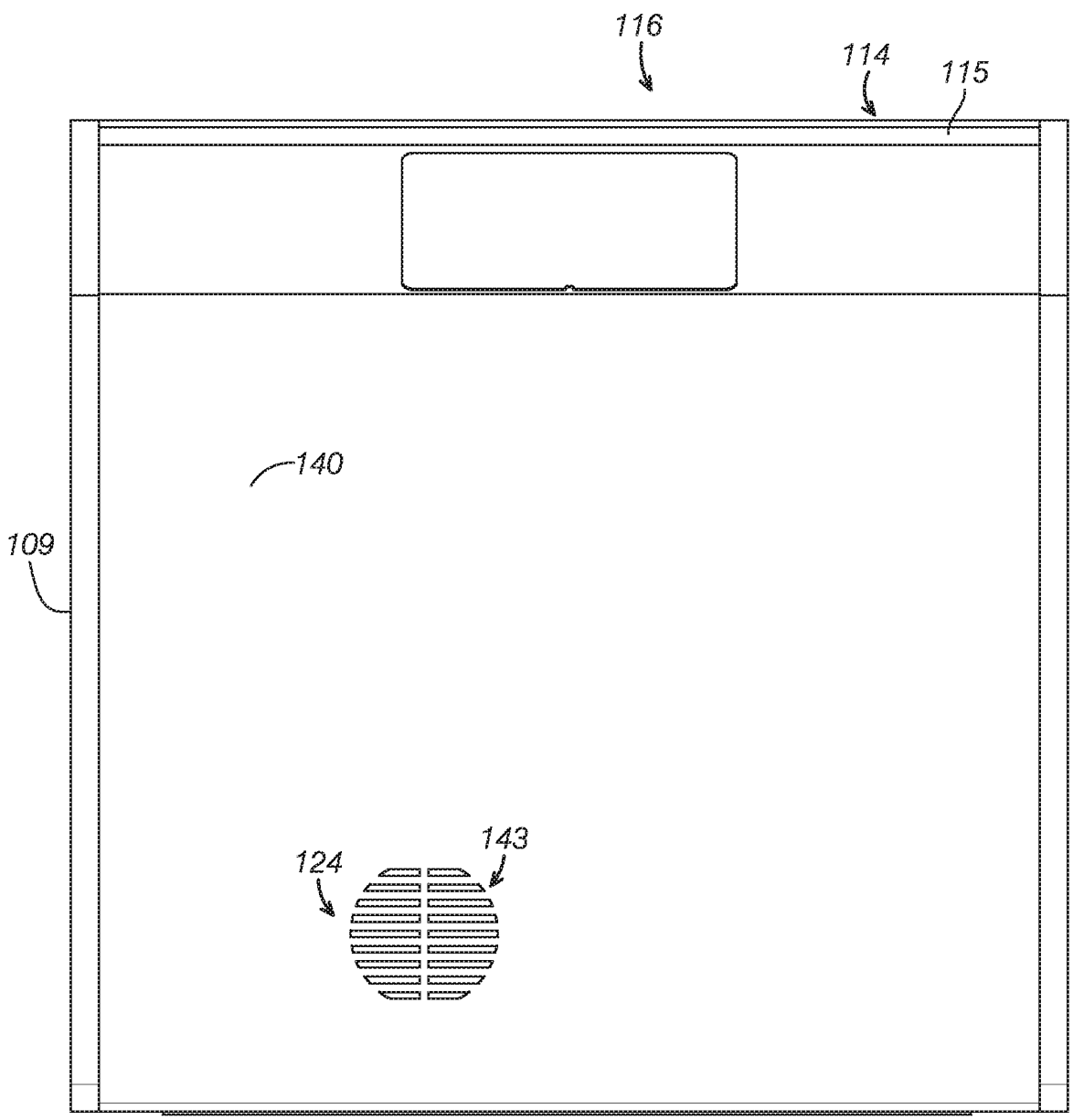
FIG. 6 is a top plan view of the device shown in FIG. 1, depicting the door in a closed position and an exhaust outlet defined in a roof of the enclosure.

The reader will observe in FIGS. 5 and 7 that device 100 is also configured to be powered by a stationary power source in the form of main line power delivered by a plug inserted into a socket supported on the rear sidewall 109. The socket electrically couples the stationary, main line power supply to power supply 170 to convert the alternating current supply to direct current for device 100 to use. The main line power supply could be provided by conventional and renewable power sources, such as solar, wind, and wave energy.

Supporting Electronics

As shown in FIG. 7, device 100 includes supporting electronic components in the space between ceiling 108 and roof 140 in addition to exhaust fan 142 and portable power supply 156. In the particular example shown in FIG. 7, device 100 includes a power supply 170, a temperature controller 172, wires 174, and connection terminals 176. Other device examples include fewer, additional, or alternative supporting electronic components, such as printed circuit boards. Any currently known or later developed electronics, computing devices, and the like may be included.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of die inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims m the present application or in a related application. Such amended or new claims, whether they are directed to the same invention or a different invention and whether they are different, broader, narrower or equal ire scope to the original claims, are to be considered within the subject matter of the inventions described herein.

The invention claimed is:

1. A device for prolonging the quality of a warm food item contained within the device, comprising:
    an enclosure configured to receive the warm food item, the enclosure including:
        a floor;
        a ceiling opposite the floor;
        sidewalls extending from the floor to the ceiling and defining an opening, the sidewalls, the floor, and the ceiling collectively defining an interior void of the enclosure; and
        a door operatively connected to the sidewalls in a position covering the opening in a closed position and configured to selectively move to an open position to provide access to the interior void through the opening;
    a convection heat source mounted inside the enclosure and configured to direct heated air within the enclosure;
    a ventilation system mounted to the enclosure and configured to move air through the enclosure; and
    a radiant heat source mounted inside the enclosure in a position to irradiate the warm food item received in the enclosure.

2. The device of claim 1, further comprising a shelf supported in the enclosure within the interior void, the shelf including a top surface configured to support the warm food item.

3. The device of claim 2, wherein the convection heat source includes a header system configured to direct heated air into the enclosure from a plurality of positions extending transverse to the opening along the sidewalls.

4. The device of claim 3, wherein the header system includes a pipe extending along one of the sidewalls and transverse to the opening, the pipe defining heated air ports along the length of the pipe.

5. The device of claim 1, wherein the door includes linked slats enabling the door to follow a curved path when moving between the open position and the closed position.

6. The device of claim 2, wherein the header system is mounted to the enclosure within the interior void proximate the sidewalls.

7. The device of claim 6, wherein the shelf is supported in the enclosure in a position surrounded by the header system.

8. The device of claim 7, wherein:
    the header system includes a lower portion proximate the shelf and an upper portion spaced from the shelf;
    the lower portion of the header system is positioned to direct heated air into the interior void underneath the warm food item supported on the shelf; and
    the upper portion of the header system is positioned to direct heated air into the interior void above the warm food item supported on the shelf.

9. The device of claim 8, wherein the radiant heat source is mounted inside the enclosure between the lower portion and the upper portion of the header system.

10. The device of claim 9, wherein the radiant heat source is mounted to the sidewalls inside the enclosure.

11. The device of claim 10, wherein the radiant heat source is substantially planar.

12. The device of claim 2, wherein:
    the enclosure includes a roof spaced above the ceiling; and
    the ventilation system includes:
        an exhaust fan mounted in the roof, the exhaust fan configured to direct air from within the enclosure out of the enclosure; and a vent defined in the sidewalls proximate the floor, the vent configured to supply fresh air from outside the enclosure into the enclosure.

13. The device of claim 2, further comprising an air directing system configured to direct air within the enclosure towards the warm food item when the warm food item is supported on the top surface of the shelf.

14. The device of claim 13, wherein the air directing system includes:
   a ceiling fan mounted to the ceiling and configured to direct air towards the top surface of the shelf; and
   a floor fan mounted to the floor and configured to direct air towards the ceiling.

15. The device of claim 14, wherein the floor fan is disposed underneath the shelf in a position to direct air towards an underside of the warm food item when the warm food item is supported on the top surface of the shelf.

16. The device of claim 1, wherein the sidewalls are comprised of a thermally insulating material.

17. The device of claim 1, wherein the enclosure is complimentarily configured with a vehicle to facilitate transporting the warm food item in the enclosure with the vehicle.

18. The device of claim 17, further comprising a portable power source configured to power one or more of the convection heat source, the radiant heat source, and the ventilation system to facilitate the device prolonging the quality of the warm food item when the device is transported.

19. A device for prolonging the quality of a warm food item contained within the device, comprising:
   an enclosure configured to receive the warm food item, the enclosure including:
      a floor;
      a ceiling opposite the floor;
      a roof spaced above the ceiling;
      sidewalls comprised of a thermally insulating material extending from the floor to the roof and defining an opening, the sidewalls, the floor, and the roof collectively defining an interior void of the enclosure; and
      a door operatively connected to the sidewalls in a position covering the opening in a closed position and configured to selectively move to an open position to provide access to the interior void through the opening;
   a shelf mounted to the enclosure within the interior void, the shelf including a top surface configured to support the warm food item;
   a convection heat source mounted inside the enclosure above the shelf and proximate the sidewalls and configured to direct heated air within the enclosure from a plurality of positions, the convection heat source including a pipe defining heated air ports along the length of the pipe;
   a substantially planar radiant heat source mounted to the sidewalls inside the enclosure and configured to irradiate the warm food item supported on the shelf;
   a ventilation system mounted to the enclosure and configured to move air through the enclosure, the ventilation system including:
      an exhaust fan mounted in the roof, the exhaust fan configured to direct air within the enclosure out of the enclosure; and
      a vent defined in the sidewalls proximate the floor and below the shelf, the vent configured to supply fresh air from outside the enclosure into the enclosure; and
   an air directing system configured to direct air within the enclosure towards the warm food item when the warm food item is supported on the top surface of the shelf, the air directing system including:
      a ceiling fan mounted to the ceiling and configured to direct air towards the top surface of the shelf; and
      a floor fan mounted to the floor underneath the shelf and configured to direct air towards the ceiling.

* * * * *